July 16, 1968

W. RESCH ET AL 3,393,006

LISTING WIRE SUPPORT CLIP

Filed Nov. 10, 1966

INVENTORS
Werner Resch &
Alan J. Shelton

F. J. Fodale
ATTORNEY

United States Patent Office 3,393,006
Patented July 16, 1968

3,393,006
LISTING WIRE SUPPORT CLIP
Werner Resch, Royal Oak, and Alan J. Shelton, Birmingham, Mich., assignors to General Motors Corporation, Detroit, Mich., a corporation of Delaware
Filed Nov. 10, 1966, Ser. No. 593,533
4 Claims. (Cl. 296—137)

ABSTRACT OF THE DISCLOSURE

A listing wire support which may be mounted in either a hole or on a tab. The listing wire support has a generally U-shaped body cradled to receive the listing wire. The support terminates in two substantially parallel legs which are coiled with respect to the main body and which have transversely disposed hooks at the terminal end. The transversely disposed hooks open away from each other and overlap thus providing capability for mounting in a hole or on a tab.

---

Our invention relates generally to vehicle body headlining support means and more particularly to a listing wire support for supporting the headliner listing wire midway between its ends.

Headliners are supported in vehicle bodies by listing wires disposed in loops provided on the hidden side of the headliner. The listing wires are transversely disposed in the vehicle passenger compartment and have the ends suitably secured to the underside of the vehicle roof. In order to prevent headliner sag without using an exceedingly rigid listing wire, it is often desirable to support the listing wire midway between its ends in some fashion.

It is highly desirable that the listing wire support be capable of being assembled into existing or easily modified roof structure or in the event there is no existing roof structure, into structure which can easily be provided. Generally speaking, vehicle roofs are provided with transverse bows or channel members welded to the roof to increase its rigidity. Some bows easily provide a mount for the listing wire support by simply drilling or punching a hole in the channel portion spaced from the roof. In areas where a listing wire support is needed but no bow is present, a tab spotwelded to the roof or some similar structure provides a simple mount for the listing wire support.

Accordingly, our invention is directed to providing a listing wire support which can either be mounted in a hole or on a suitable tab. The provision of a single listing wire support capable of dual mounting simplifies the production assembly of the headliner since the one support may be used in both applications eliminating the need for a second different support and the complication and confusion associated with it.

With these and other objects in view, as will hereinafter more fully appear, and which will be more particularly pointed out in the appended claims, reference is now made to the following description taken in connection with the accompanying drawings in which:

Figure 1:
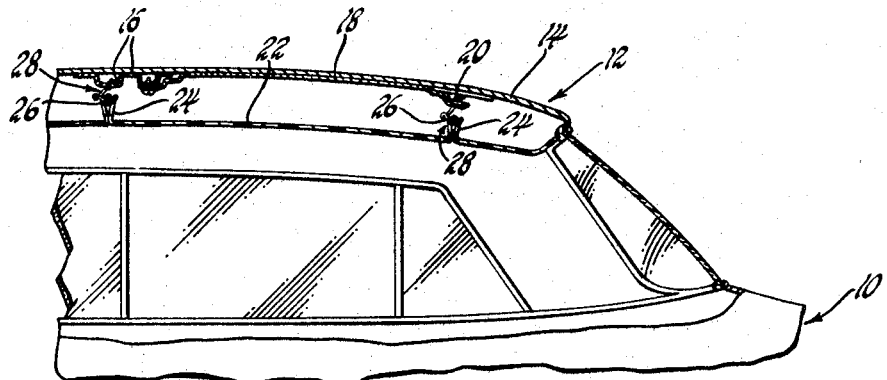
FIGURE 1 is a partially broken away partial elevation of a vehicle body embodying headliner listing wire supports in accordance with our invention.

Referring now to the drawings and more particularly to FIGURE 1, a vehicle body designated generally at 10 includes a roof structure 12 which includes a roof panel 14. The roof panel 14 is provided with a transverse bow or channel 16 suitably secured to the roof panel 14 to increase the rigidity of the roof panel. The channel 16 is a double one and comprises two flanged U-shaped members with their inboard flanges integral. A longitudinal channel member or bow 18 is secured at its forward end to the aft portion of the transverse channel 16 by a metal screw or the like. The channel 18 is spotwelded or otherwise suitably secured to the roof and runs toward the rear of the vehicle. The aft end of the bow 18 terminates in a tab 20 spaced from the roof panel 14. The headliner 22 includes a number of transverse loops 24 provided on the hidden sides of the headliner. Listing wires 26 are disposed in these loops for supporting the headliner in the passenger compartment. The listing wires 26 are suitably secured to the roof 12 at their outer ends (not shown). In order to prevent headliner sag without an excessively rigid listing wire, the listing wires 26 are supported at their midsections by supports 28.

Figure 2:
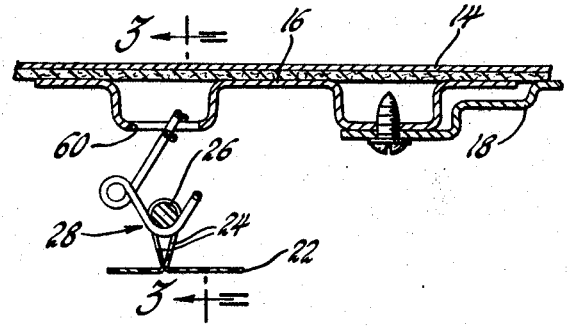
FIGURE 2 is an enlarged view of a portion of FIGURE 1 showing the listing wire support suspended from a hole in a channel.
Figure 3:
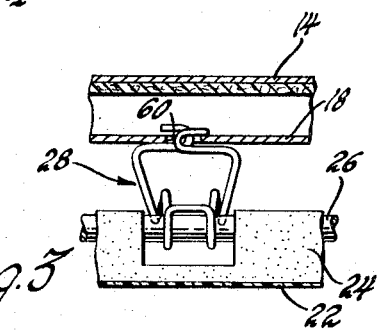
FIGURE 3 is a section taken along the line 3—3 of FIGURE 2 and looking in the direction of the arrows.
Figure 5:
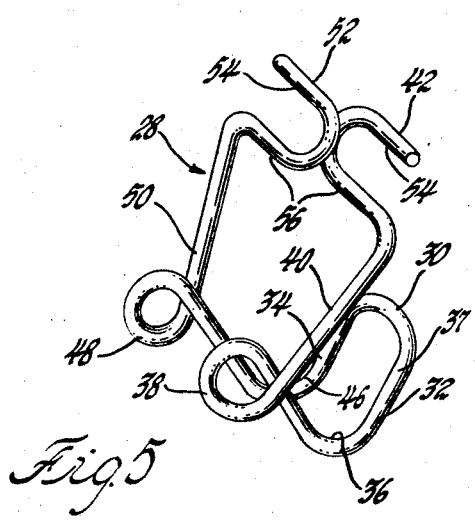
FIGURE 5 is an enlarged perspective view of a listing wire support in accordance with our invention.

Referring to FIGURE 5, the listing wire support 28 is made from a length of wire having various bends and turns. The support 28 may be considered a generally U-shaped length of wire (the bottom of the U being indicated at 30 in the drawings) with the legs 32 and 34 of the U bent at various locations. Each leg is a mirror image of the other leg so that one leg only need be described. Moving from the bottom of the U 30 along the leg 32, the first bend occurs at 36. It is somewhat less than 90° with the bend having an inner line contact with the circumference of the listing wire of somewhat more than 90°. (See FIGURES 2 and 3.) The numerical values are only for the purpose of aiding in describing the support, the important feature being that the legs 32 and 34 are bent so as to form a cradle adapted to receive the listing wire. For convenience in terminology, we may describe the support as thus far described as a generally U-shaped body 37 having curved cradles extending from each leg of the U. Moving further along the leg 32 beyond the bend or cradle 36, it is seen that the leg 32 is then looped into a single coil 38 and continues with a straight segment 40 somewhat parallel to the body 37. The purpose of the coil 38 is to make the cradle 36 somewhat resilient so that the cradle 36 may be pulled down for receipt of the listing wire 26 where existing roof structure does not permit ready accessibility to the cradle 36. The end of the leg 32 terminates in a reverse bend or hook 42. The other leg 34 similarly has a cradle portion 46, a loop or coil 48, straight segment 50, and reverse bend hook 52. The hooks 42 and 52 open opposite each other with their inboard portions overlapping. They are transversely disposed with respect to the straight segments 40 and 50 and lie generally in the same plane. An important feature of the support resides in the fact that the legs 32 and 34 may be squeezed together by applying inwardly directed forces on the straight segments 40 and 50 to increase the amount of overlap of the hooks 42 and 52. The hooks 42 and 52 each present two portions for suspension from the body roof, one being identified at 54 on each hook and the other at 56 on each hook.

Referring now to FGURES 2 and 3, we have illustrated how our support is mounted or suspended from a hole 60 in a roof bow. The support is squeezed to increase the overlap of the hooks 42 and 52 until the portions 54 fit through the hole 60. The support is then released so that the hooks spread apart with the roof bow adjacent the hole 60 disposed between the portions 52 and 56, respectively. The listing wire is then cradled in the support. If existing roof structure prevents accessibility to the cradle, it may be pulled down against the action of the coils 38 and 48 so that the listing wire 26 may be inserted into the cradle 36.

Figure 4:
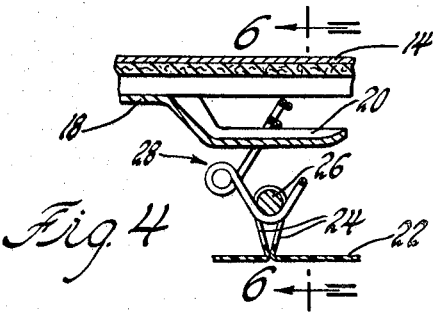
FIGURE 4 is an enlarged view of a portion of FIGURE 1 showing the listing wire support suspended from a tab.
Figure 6:
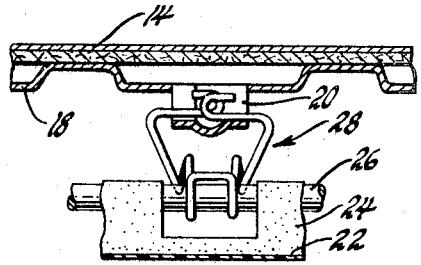
FIGURE 6 is a section taken along the line 6—6 of FIGURE 4 and looking in the direction of the arrows.

Referring now to FIGURES 4 and 6, it is seen that the same support may be suspended from the tab 20 by merely hanging the support on the tab 20 wtih the hook portions 56 abutting the tab.

Thus it can be seen that we have provided a listing wire support which can either be mounted in a hole or on a suitable tab.

Various modifications are contemplated and may obviously be resorted to by those skilled in the art without departing from the spirit and scope of the invention, as hereinafter defined by the appended claims, as only a preferred embodiment thereof has been disclosed.

We claim:

1. A listing wire support comprising,
 a generally U-shaped body including a curved cradle portion adapted to support a listing wire, said body having first and second substantially parallel legs extending from the ends thereof,
 a hook on the free end of each leg transversely disposed with respect thereto and opening away from the other leg whereby said legs and hooks are resiliently contractable toward each other whereby said support may be mounted in a panel aperture, and a coil in each leg between said hook and said cradle whereby said cradle is resiliently mounted on said legs.

2. The listing wire support as defined in claim 1 wherein the hooks overlap each other.

3. In a vehicle body having a roof structure and a headlining listing wire, a roof member having a generally horizontally disposed portion with an aperture therein, and a listing wire support comprising,
 a generally U-shaped body having first and second substantially parallel legs extending from the ends thereof, said U-shaped body including a curved cradle portion adapted to support said listing wire,
 a hook on the free end of each leg transversely disposed with respect thereto and opening away from the other leg, said hooks overlapping each other and said hooks and legs being contractable toward each other whereby the hooks may be inserted in the aperture and supported therein, and
 a coil on each leg between the hook and the cradle whereby the cradle is resiliently mounted with respect to the legs.

4. In a vehicle body having a roof structure and a headlining listing wire, a roof member having a generally horizontally disposed tab and a listing wire support comprising,
 a generally U-shaped body having first and second substantially parallel legs extending from the ends thereof, said U-shaped body including a curved cradle portion adapted to support said listing wire,
 a hook on the free end of each leg transversely disposed with respect thereto and opening away from the other leg, said hooks overlapping each other and supported on said tab, and
 a coil on each leg between the hook and the cradle whereby the cradle is resiliently mounted with respect to the legs.

References Cited

UNITED STATES PATENTS

| | | | |
|---|---|---|---|
| 2,527,713 | 10/1950 | Dunn | 24—261.2 |
| 3,032,845 | 5/1962 | Whyte | 24—73 |

BENJAMIN HERSH, *Primary Examiner.*

R. SONG, *Assistant Examiner.*